United States Patent [19]

Black et al.

[11] 4,027,925
[45] June 7, 1977

[54] DETACHABLE ROAD PROTECTING DEVICE FOR TRACKED VEHICLES

[76] Inventors: Chester A. Black, Black Trac-Pad, Box 296, Stanley, Kans. 66223; Lester A. Black, 1106 Second St., Alva, Okla. 73717

[22] Filed: June 26, 1975

[21] Appl. No.: 590,617

Related U.S. Application Data

[63] Continuation of Ser. No. 469,092, May 13, 1974, abandoned.

[52] U.S. Cl. .................................... 305/46; 305/51
[51] Int. Cl.² ............................................. B68D 55/08
[58] Field of Search ............... 305/46, 51, 54, 55, 305/56; 301/44 R, 44 T; 152/170, 171

[56] References Cited

UNITED STATES PATENTS

| | | | |
|---|---|---|---|
| 1,473,425 | 11/1923 | Hallanan | 301/44 T |
| 2,141,421 | 12/1938 | Taylor | 305/51 |
| 2,161,486 | 6/1939 | Rider | 305/51 |
| 2,869,932 | 1/1959 | Eichweber | 305/51 |
| 2,969,258 | 1/1961 | Murray | 305/35 |
| 3,058,783 | 10/1962 | Wadsworth | 305/51 |
| 3,666,327 | 5/1972 | Padilla | 305/35 |
| 3,764,185 | 10/1973 | Symmank | 305/54 |

FOREIGN PATENTS OR APPLICATIONS 748,081  6/1933  France .................................. 305/51

*Primary Examiner*—Joseph F. Peters, Jr.
*Assistant Examiner*—John A. Carroll
*Attorney, Agent, or Firm*—Thomas M. Scofield

[57] ABSTRACT

Improvements in road-protecting devices for tracked vehicles removably securable to the individual elements of the tracks; road protecting devices having resilient tensioning devices associated therewith operable to strongly retain such on the tracks even when the track elements are aggregate loaded; improved tensioning and connecting means for road protecting devices which are largely located out of the load thrust lines of use whereby the devices may be entirely of resilient deformable rubber without basing or cover plates or bolts or ties associated therewith; high capacity tension devices of resilient character received within the bodies of resilient protective devices at least in part with track connecting means located out of the thrust line; improved track engaging means (connecting devices) which retain engagement on individual track elements despite temporary relief of tension thereon due to turning of the tracked vehicle.

10 Claims, 20 Drawing Figures

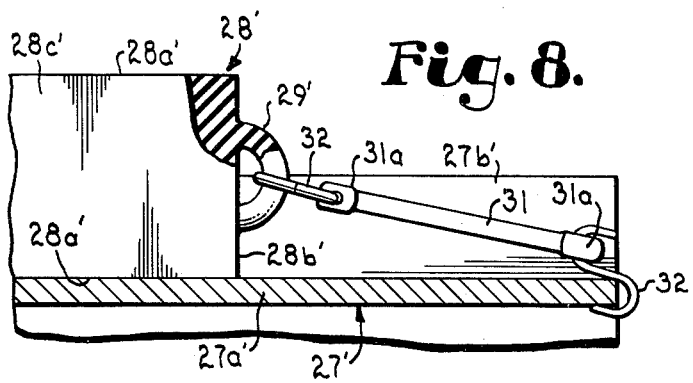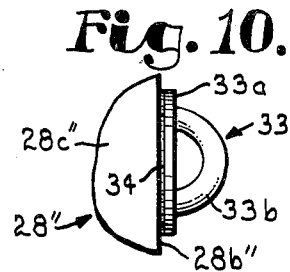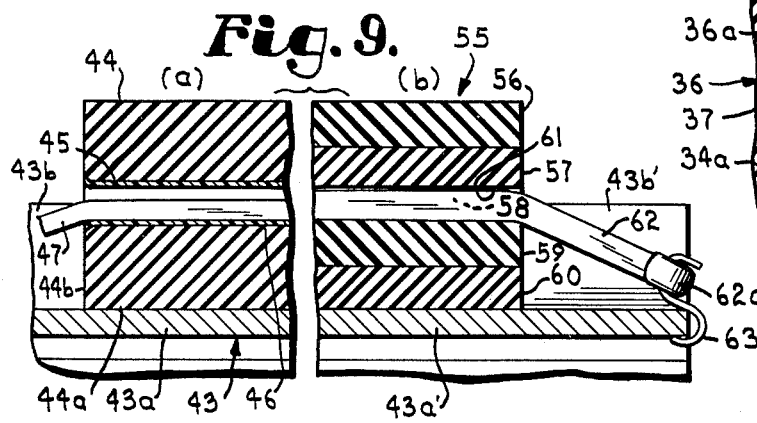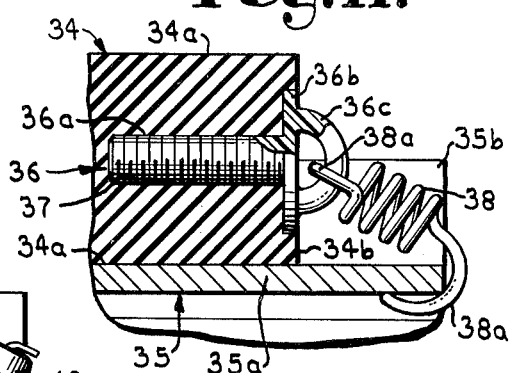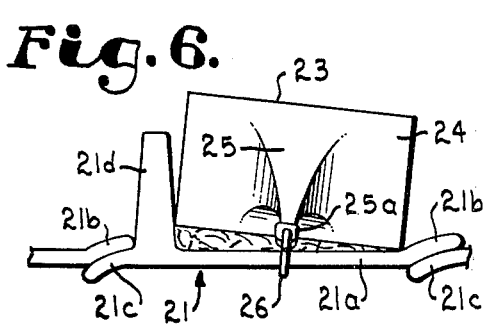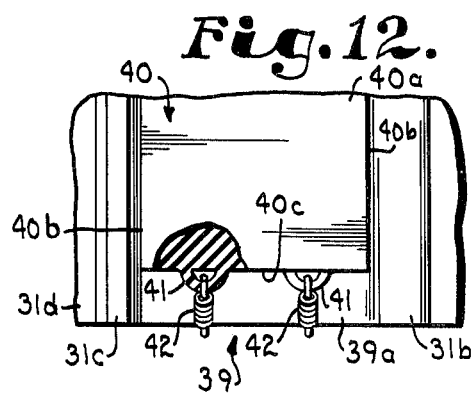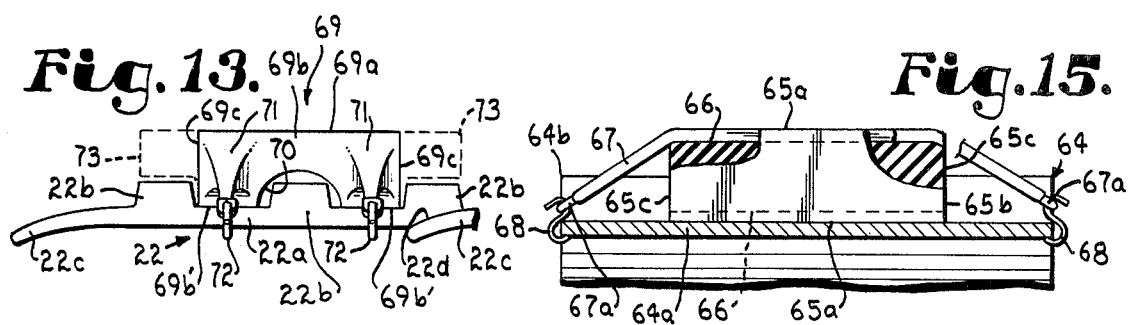

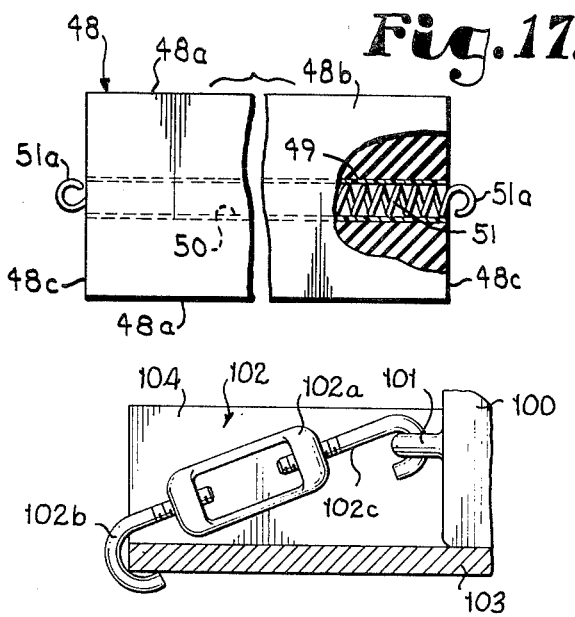
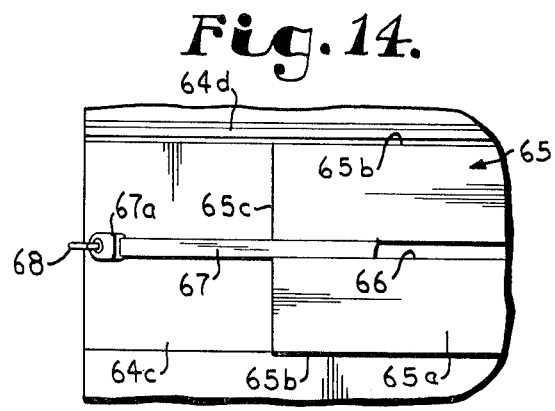
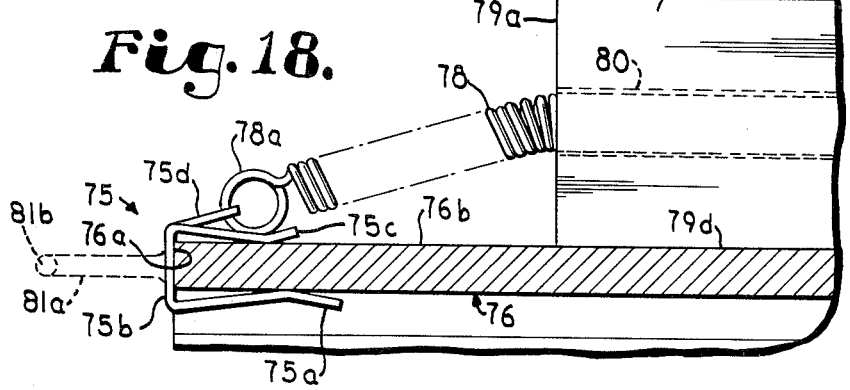
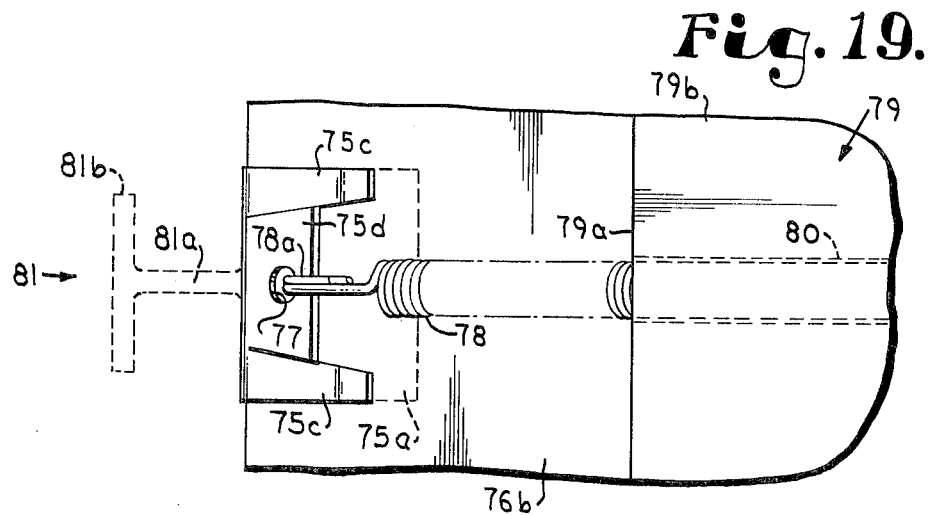

DETACHABLE ROAD PROTECTING DEVICE FOR TRACKED VEHICLES

This is a continuation of application Ser. No. 469,092, filed May 13, 1974, now abandoned.

THE PRIOR ART

Applicants are aware of the following United States patents, directed to protective devices attached to the tracks of tracked vehicles, over which the instant invention is an improvement:

Saives U.S. Pat. No. 1,568,090, issued Jan. 5, 1926 for "Endless Tracked Vehicle";

White U.S. Pat. No. 1,635,596, issued July 12, 1927 for "Rubber Tread Attachment for Track Links";

Rider U.S. Pat. No. 2,161,486, issued June 6, 1939 for "Street Plate for Tractors";

Baker U.S. Pat. No. 2,686,697, issued Aug. 17, 1954 for "Tread Construction";

Eichweber U.S. Pat. No. 2,869,932, issued Jan. 20, 1959 for "Detachable Road Protecting Device for Tractors, Track Laying Vehicles and the Like";

Moore U.S. Pat. No. 2,967,737, issued Jan. 10, 1961 for "Detachable Traction Units";

Murray U.S. Pat. No. 2,969,258, issued Jan. 24, 1961 for "Overshoe Attachment for Track Laying Vehicles";

Wadsworth et al U.S. Pat. No. 3,058,783, issued Oct. 16, 1962 for "Accessory Traction Units";

Wadsworth et al U.S. Pat. No. 3,117,824, issued Jan. 14, 1964 for "Accessory Traction Units"; and Darland U.S. Pat. No. 3,441,321, issued Apr. 29, 1969 for "Auxiliary Non-Metallic Crawler Traction Overtrack".

BRIEF DESCRIPTION OF THE INVENTION

It has long been known to the art that endless track vehicles, such as bulldozers, tractors and the like, will damage certain surfaces if driven thereover, such as roads, flooring, certain foundations, parking lots, etc.. It is also old in the art to attempt to provide resilient rubber or composition pads for attachment to the individual track segments, shoes or tread plates to attempt to cushion the impact of the vehicle on the surface being traversed, indeed, maintain the track itself out of contact with such surface or road. Numerous prior art devices are seen in the patents listed in the preamble to this specification directed to this problem. Unfortunately, these prior art devices have not solved the problem. While it is clear to the art that a resilient pad portion for a protector must be provided, almost invariably such devices incorporate rigid over or under plate foundations or protectors. Yet further, the means for attachment of such devices, while many and ingenious, also have objectionable features which have prevented the commercial and practical adoption of the prior art devices. Thus, specifically, the incorporation of rigid elements with a protector or pad almost invariably prevents the use of such device with a vehicle which has been operating in mud, aggregate, asphalt or the like where deposits of such material, or any material, may have adhered to the tracks. The necessity of cleaning off a multiplicity of track plates or segments in order to briefly apply protectors to the endless track (such as to cross a road) is too laborious and time consuming to be feasible.

Yet further, the attaching means for such protectors, as seen in the prior art, also, almost invariably, require clean track segments for actual use of the attaching means or even applicability of the protectors or pads at all. Again, time and labor considerations make such impractical. Yet further, the provision of rigid or complicated attaching means such as shafts, spring loads, arms and the like which fall in the line of load of the tractor are highly objectionable because of their vulnerability to damage or destruction.

In view of the above facts and for other reasons, the prior art concepts of protective pads applied to all or a multiplicity of the track plates or track segments of an endless track vehicle have never come into accepted general use. In place thereof, planks, tire casings, and the like are conventionally used which means are often not readily available, or require transport thereof to the site of use, as well as storage thereat.

Accordingly, the instant improvement comprises resilient, flexible and deformable blocks or bodies of rubber or plastic material which are of a length substantially to overlie an individual endless track segment or plate on the outer surface thereof and a width lesser than such plate or segment and such resilient attaching means from the sides thereof as to permit ready attachment and detactment thereof to such endless track plates or segments. The character of the protective blocks or pads and their attachment means to the track segments are such as to overcome or obviate the objections to practical use present in the previous devices known to the art.

OBJECTS OF THE INVENTION

A basic object of the invention is to provide improveddetachable road protecting devices which may be removably mounted on the individual tracks, plates or shoes of an endless tracked vehicle such as tractors, bulldozers and the like.

Another object of the invention is to provide flexible, resilient and somewhat deformable blocks of plastic material adapted for use as road protecting devices mounted on the track elements of endless tracked vehicles, together with resilient, tensionable attaching means for same, which greatly improve over the prior art known devices for like purposes.

Another object of the invention is to provide road protecting devices which are readily and easily attached to and detached from the track elements, shoes or plates of an endless track on a vehicle and which operate to fully and adequately protect roads or vulnerable surfaces from passage of such vehicle thereover, such improved devices not requiring or having any rigid elements or plates or vulnerable attaching means combined therewith and additionally being usable when the vehicle tracks are covered with mud or aggregate.

Another object of the invention is to provide resilient, flexible, deformable yet shape retaining, road protecting blocks or devices which are so sized and possess such features that same may be used effectively with endless tracks of varying widths.

Another object of the invention is to provide resilient, flexible, deformable yet shape retaining protective devices removably securable to individual track elements of tracked vehicles which are strong, simple, relatively inexpensive, very rugged under prolonged use, weather resistent and effectively usable under all conditions to accomplish their desired purposes.

Another object of the invention is to provided improved road protective devices of laminated, reenforced and/or monolithic block form which are adaptable for use with various types of tensioning devices including elongate elastic strips, coil springs and over-center toggle devices.

Another object of the invention to provide such improved road protective devices which are adaptable for use with various sorts of track elements employed in endless tracked vehicles such as tractors and bulldozers, including standard service track shoes, extreme service track shoes and triple grouser shoes.

Another object of the invention is to provide resilient, flexible, deformable yet shape retaining road protecting devices having extremely versatile, adjustable and adaptable fastening or connecting means to the track elements of an endless track vehicle, wherein such connecting or attaching elements are readily replaceable, extremely strong and adapted to association with additional connecting or attaching means to give great versatility to the said road protecting devices with respect to use with tracks of differing widths or configurations and under varying conditions of cleanliness and/or use.

Another object of the invention is to provide removably attachable road protective devices of the character described of varying types, all of which either inherently incorporate attaching means of effective extreme tension or may be associated with connecting or attaching means of great tension, thereby to retain the usefulness of the protective devices even when the endless track is coated with soft mud, hard aggregate, tar, asphalt or the like.

Another object of the invention is to provide improved connecting and attaching means for resilient blocks operating as road protective devices, which attaching and connecting means are extremely strong, are largely positioned out of the load thrust of the vehicle or of such character as to be impervious thereto, are readily replaceable and, further, are readily associated with extensions or tensioning devices to provide the greatest versatality and usefulness, as well as usability in the protective devices themselves.

Another object of the invention is to provide improved road protecting devices and connecting means therefor which take up a minimum of space, have minimum weight and are relatively cheap for the service involved and the versatility and usefulness inherent thereto.

Another object of the invention is to provide improved track engaging means or connecting devices which will contact and continuously engage, with a clamp-type action, the sipes edges of an individual track element so that, if tension is released temporarily on the connecting device by twisting or turning action of the vehicle (resulting in a shifting or twisting of the road protecting device), the connecting means or clamp-type engagement will remain in positive engagement with the track until the tension returns thereto, whereby to always maintain the road protecting device on the individual track element.

Another object of the invention is to provide improved track element edge engaging means which cooperate with the tensioning means and devices so as to permit greater maneuverability and versatility of action of the tracked vehicle when the road protective devices are mounted on the track elements thereon.

Other and further objects of the invention will appear in the course of the following description thereof.

In the drawings, which form a part of the instant specification and are to be read in conjunction therewith, embodiments of the instant invention are shown and, in the various views, like numerals are employed to indicate like parts.

DESCRIPTION OF DRAWINGS

FIG. 6 is an enlarged schematic view of one plate or link of an endless tracked vehicle having aggregate or dirt thereon with the device of FIGS. 1–5, inclusive attached to the track plate over such aggregate.

FIG. 8 is a fragmentary end view of a like modification of the subject detachable road protecting device mounted on one link or plate of an endless track, this form comprising an integral molded monolithic block having integrally molded therewith an eyelet to which may be attached a resilient connecting means, here shown as a resilient cord carrying hooks removably attached to the ends thereof, engaging the eyelet and the track element.

FIG. 9 shows in end section another modification of the improved detachable road protecting device comprising a resilient, flexible block having a passageway provided therethrough. The resilient attaching means here comprises an elongate elastic strip with eyelets at the ends thereof to receive hooks for engaging the side edges of tracks of an endless tracked vehicle. The left side view (FIG. 9a) shows a monolithic cast block with a central sleeve therewithin. The right side (FIG. 9b) shows a laminated block with a relief in the central laminate providing the passage.

FIG. 10 is a fragmentary end view of a variation of the FIG. 7 and 6 showings involving an eyelet adhesively attached to the side wall of a monolithic, resilient, flexible block.

FIG. 11 is a fragmentary end section view of another variation of the FIG. 7–9, inclusive devices (utilizing eyelets at the sides thereof for engagement with coil springs or resilient attaching and connecting devices), in this case the eyelet attached to an externally threaded or grooved bolt or shaft which is integrally received in and connected to the monolithic road protecting device.

FIG. 12 is a fragmentary plan view of a modified form of the detachable road protecting device of FIGS.

7-11, inclusive wherein the integral, molded eyelets or loops are paired on each side of the resilient, flexible, monolithic block whereby to receive, in this view, two coil springs on each side for greater stability in attachment to the tracks or track elements of the tracked vehicle.

FIG. 13 is a side elevation of a variant form of track element on a tracked vehicle with a modified detachable road protecting device secured thereon, same having paired resilient side extensions for removable connection to the track element. This view also shows optional resilient wings or extensions on the front and rear ends of the resilient protective device in dotted lines.

FIG. 14 is a plan view of another modification of the subject detachable road protecting device wherein the monolithic, resilient, flexible block has a groove or channel formed in the upper surface thereof, same to receive a resilient cable or strap thereover for its attachment to the individual track elements of a tracked vehicle.

FIG. 15 is a front elevation of the device of FIG. 14 with portions cut away to better illustrate the construction of the block and the engagement thereof with the resilient cable, as well as the attachment of the latter to the individual track element.

Figure 16:
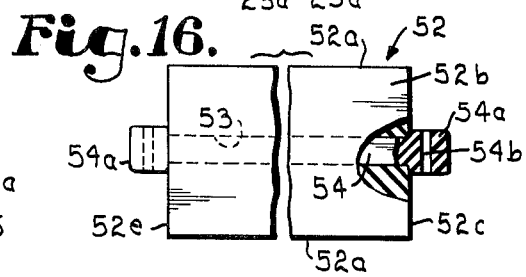

FIG. 16 is a front elevation of a detachable road protecting device of the character of those devices seen in FIGS. 9a and 9b, comprising a monolithic cast block with a central passage therethrough and an elongate elastic strip with eyelets at the ends thereof to receive hooks therethrough. This showing differs from FIGS. 9a and 9b in that the resilient strap is shorter, with the eyelets positioned immediately adjacent the sides of the block, whereby coil springs (as in FIG. 11) or additional elongate resilient straps (as in FIG. 8) would be used therewith to engage the side edges of the track.

FIG. 17 is a detachable road protecting device of the character seen in FIG. 16 (a monolithic cast block having a central passage therethrough), this view differing from that of FIG. 16 in that an elongate coil spring is received within the said block rather than the resilient strap of FIG. 16.

FIG. 18 is a front view of an improved connecting device or track element edge engaging means shown gripping the side edge of a track element (fragmentary).

FIG. 19 is a plan view of the connecting device or track edge element engaging means of FIG. 18 (fragmentary).

FIG. 20 is a fragmentary end view of a modification of the subject detachable road protecting device mounted on one link or plate of an endless track, this form comprising an integral, molded, monolithic block having integrally molded therewith an eyelet (see FIG. 8, FIG. 10 or FIG. 11) to which may be attached a turnbuckle connecting means.

GENERAL FEATURES

The various figures show simple, cheap, versatile road protecting devices readily adaptable to either standard service or extreme service track shoes, plates or elements. Endless tracks are elongate plates, typically or greater width than length, which are removably bolted or otherwise attached to an underlying drive structure. These plates articulate at their forward and rearward ends with one another and carry one or more ridges, cleats or spines extending across the width thereof. A standard service shoe has a lesser height single cleat, an extreme service shoe has a greater height single cleat and a triple grouser shoe typically has three ridges or cleats thereacross spaced apart on the working surface of the shoe. These are merely typical variations and not limiting.

Figure 1:
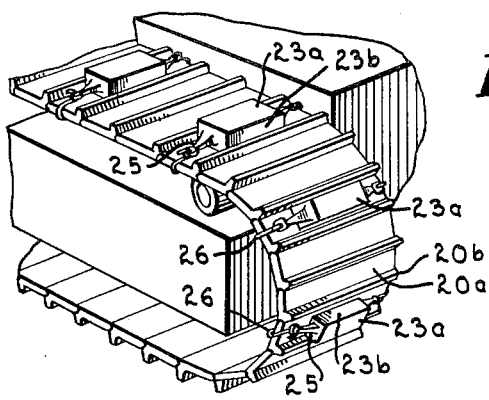
FIG. 1 is a three-quarter perspective view from above of a portion of the endless track of a tracked vehicle (schematically indicated) with a plurality of a first, preferred form of the subject detachable road protecting device mounted on every other plate or link of the track.
Figure 2:
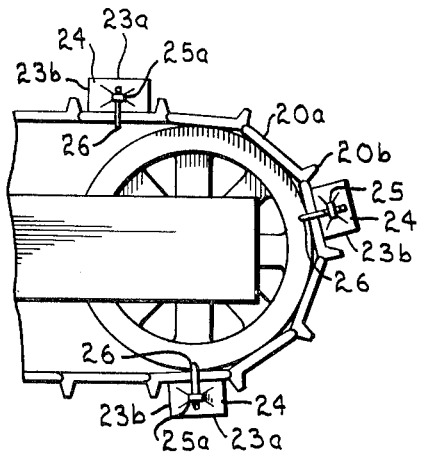
FIG. 2 is a side view of a portion of the track of an endless tracked vehicle showing a plurality of the said detachable road protecting devices of the first form or type mounted thereon (also schematic).
Figure 3:
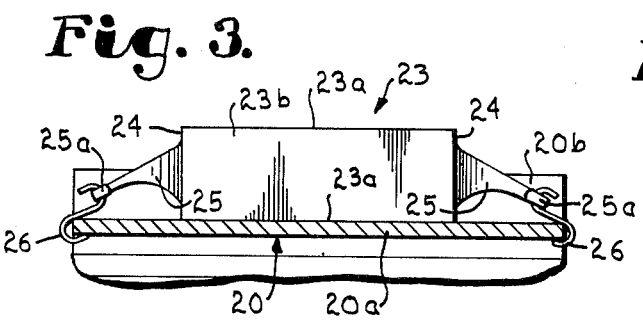
FIG. 3 is an end sectional view of one track element or link in an endless track showing the first form of detachable road protecting device mounted thereon by hooks.

FIGS. 1-3, inclusive schematically show standard service track shoes 20 (generally designated) with a flat body portion 20a and a following cleat or ridge 20b (when the bulldozer or tractor is going forward). The representation in FIG. 6 of a typical extreme service shoe 21 having an essentially flat main body portion 21a, an arcuately curved leading portion 21b (outwardly) and a following arcuately inward portion 21c is more detailed. A large cleat or ridge 21d extends outwardly transversely of extreme service shoe 21. In FIG. 13, there is seen, in side view, a standard triple grouser shoe 22 having a body portion or basic plate 22a three cleats or ridges 22b and an inward arcuately curved tail portion 22c. The front portion of track shoe 22 is inwardly and arcuately formed at 22d to overlie the trailing portion 22c of the adjacent shoe.

With respect to dimensions of the road protecting devices to be described, all are significant. The length of the road protecting device in each case is substantially the distance from cleat to cleat in succeeding track plates. Preferably, at least, the length (see FIG. 6) is from the cleat or spine on the plate to the beginning of the arcuate portion on the plate for mating with the succeeding plate. Said otherwise, the length of the road protective device is preferably substantially equal to the flat portion of the track plate on which it will rest, at least. The maximum length is the cleat to cleat distance.

With respect to height, in a triple grouser shoe as in FIG. 13, where the road protective device is going to overlie at least one and possibly two of the cleats, the height or thickness of the pad need only be such (over the cleats) to provide the desired strength and resiliency, while the total height from the lands or valleys between the grousers will be that thickness plus the depth of the lands or valleys. On the other hand, where the cleat is either of standard or extreme height (comparing FIG. 6 (extreme) with FIGS. 1-3, for example), the thickness or height of the road protective device must be substantially greater than the height of the cleat, ridge or spine on the plate so that, even under the load compression of the vehicle (which will be spread over numerous of the road protective devices), the cleats or ridges do not contact the surface being traversed. Since there is no reason to provide any substantial compressibility of the devices, the height of the grouser need not be exceeded by more than one to two inches, in most cases.

The width of the road protective devices, in all modifications, is going to be less and, in most cases, substantially less than the width of the tracks on which they sit. It is the combination of the length and width plus the number of road protective devices applied to a given track which provides the square footage of bearing area. There must be enough of the road protective devices with a sufficient cross-sectional bearing area that even the less resilient materials will not be simply squashed flat or contact permitted. Since there are two tracks and a multiplicity of track elements, the number of protective devices used can be adjusted to the total weight of the vehicle (with positioning every second element, every other element, or, for that matter, every element — on both sides) that any conceivable vehicle loading can be handled. This may be important in the case of extremely heavy, massive, tracked vehicle equipment.

At any rate, the first consideration of width is that the block or road protective device not be wider than the track in any case. The entire body of the device may closely approach the width of the track in the case of coil spring attachment as in FIGS. 11 and 12. The width may be very considerably less than the track width as in the examples of FIGS. 1-6, inclusive, FIG. 7, FIG. 8, and FIG. 15. Generally speaking, it is desired to have the device as wide as possible, subject to providing the tension qualities desirable for situations where the track is covered with soft aggregate, mud, tar or the like. In such case, the tension elements of the device may be varied as will be discussed below.

Summing dimension, generally speaking, the length of the device will approach the cleat to cleat span as closely as possible and at least incorporate the length of the flat portion of the track plate on which the device will rest. Since there is some resiliency, an absolute flat surface rest is not required. Strong tensioning devices are employed which will pull the device down flush on the track element. With respect to height, that height must be provided which will space the tracked vehicle up above the surface being traversed enough that the cleats do not abrade or cut into the surface. Higher cleats require greater thickness or height in the road protective device. However, the road protective devices can, if desired, always be provided in the greatest useful height and still serve with lesser height grousers efficiently and effectively. These devices are not employed to give traction and, generally speaking, are not used under turning or twisting conditions of the tracks. With respect to width, generally speaking, the maximum width with respect to a given width track is generally best, subject to the adequacy of the tension devices employed with the block or device. However, protective devices of very considerably lesser width will serve, again noting the non-traction necessity and lack of turning and twisting activity when the devices are being used.

Typical spine to spine or cleat to cleat distances on tracks will run 5 to 8, typically 6. Track widths in caterpillar tractors will run, typically, from 12 to 30 most approximately 22. 3 cleat or grouser heights are extraordinary and a 4 thickness device will easily handle all cleat heights. All purpose protective devices of transverse and vertical rectangular section would conveniently be 5 × 10 × 4 or 5 × 14 × 4. These all purpose devices may be used with a variety of attaching and tensioning means to fit different width tracks as will be described.

With respect to the shape of the road protective devices in question, most preferably (since the areas on which the devices ride are rectangular) same are blocks rectangular in transverse and vertical section. The edges in all cases may be rounded and the devices could be frusto-conical in both sides and end section, but the latter is not preferable because it is desired to have equal bearing areas on the road surface and the tracks.

The specific forms of the device will now be described.

FIGS. 1-6, INCLUSIVE

FIGS. 1-6, inclusive show a first form or type of road protective device comprising a monolithic block construction having flat, parallel top and bottom sides 23a of rectangular shape, flat, parallel, rectangular ends 23b and side surfaces 24 from which tapered, faired elongate extensions 25 extend. Extensions or tails 25 may be molded integrally with the block 23 and comprise resilient extensions thereof. The material of the block 23 and extensions 25 may be rubber, reinforced rubber, monolithic rubber or laminated slabs of rubber vulcanized to one another with the tails or extensions being integral parts of one such slab. Additionally, the blocks may be of suitable plastic, reinforced plastic, rubber substitute (such as neoprene), or the like. Reinforcements in the rubber, neoprene, synthetic or plastic body may be fiberglass, resilient threads or cloth made up of resilient threads, nylon fibers, or the like. It is preferred that the block 23 be of less resilient, less deformable and more shape retaining character than the tails or extensions 25 which are desired to act as, in some circumstances, tensioning devices. If tails or extension 25 are short, then they may be less resilient and it would be assumed that they would be employed with resilient means such as coil springs or the like. Such extensions 25 have eyelet integral heads 25a at the ends thereof to engage hooks 26, coil springs (not seen) or the like. The S-style hooks seen operate to engage with one end the eyelets 25a and with the other end the side edges of a track plate.

It is contemplated that any stengthering reinforcements such as fibers, cloth, laminations or the like be primarily incorporated into the block 23. However, monolithic, non-reinforced rubber or plastic may be employed. Under the compressive loads of the tracked vehicle to which the protective devices 23 are attached, the block must be somewhat resilient and deformable, at least slightly flexible, and have resilient side attachments, here the extensions or tails 25.

FIGS. 1-3, inclusive show the blocks 23 mounted on clean outer surface tracks or threads with S-form hooks 26 employed to engage the opposite tails 25 of a given block 23 to each track segment. FIG. 6 shows a small quantity of dirt or aggregate between the blocks 23 and the outer surface of the track 21. In the event that a larger quantity of aggregate, tar, tar and gravel, asphalt or mud were present, then coil springs (or only one of them) could be used at each side of the block (or one side of the block) to engage the sides of the track over the mound of aggregate on the track. Such coil springs are seen in FIGS. 11 and 12 attached to a different form of device. The coil springs could be used in conjunction with the hooks 26 or themselves engaging the eyelets 25a.

Figure 7:
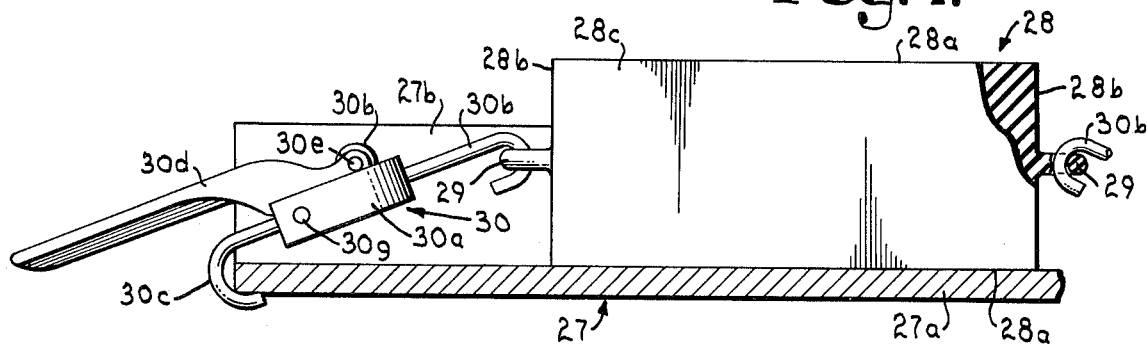
FIG. 7 is a fragmentary end sectional view of one vehicle track element showing a second form of road protecting device thereon connected at one end thereto by an over-center connector with the other end cut away for illustration of structure.
Figure 4:
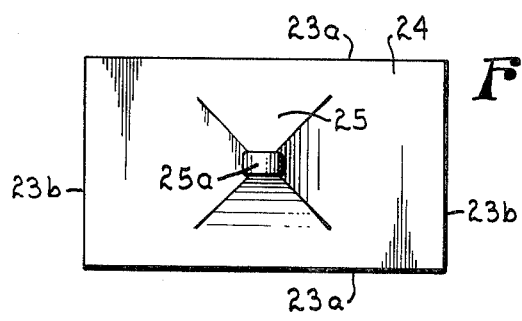
FIG. 4 is an enlarged side elevation of the device of FIGS. 1–4, inclusive without the removable hook attached to the end thereof.
Figure 5:
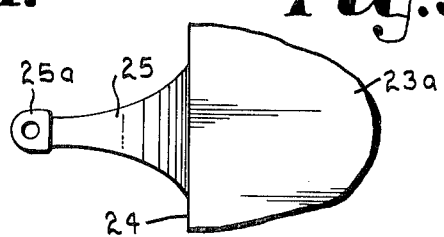
FIG. 5 is a fragmentary plan view of the device of FIGS. 1–5, inclusive without the hook engaged with the end of the resilient extension on the side.

In the event that it is desired to increase tension on a device of the character of FIGS. 1-6, inclusive when same would be employed on an aggregate coated plate or on a greater width plate, an over-center toggle of the character seen in FIG. 7 may be employed. In the case of transferring the device of FIGS. 1-6, inclusive to a greater width track than that seen in FIGS. 1-3, inclusive, the following means may be employed:

1. one or more coil springs may be employed at one or both sides of the device with or without use of the hooks 26;

2. one or more elongate resilient straps of the character seen in FIG. 8 may be employed at either or both sides of the device;
3. an over-center toggle may be applied to one or both sides of the device with or without the hooks 26, or a single toggle may be employed on one side with a spring or a resilient strap on the other.

These options also take care of the aggregate situation, depending upon the quantity of aggregate present and also the increase in track width plus presence of aggregate thereon.

FIG. 13 shows a road protective device for a triple grouser shoe which has connecting means like that of the device of FIGS. 1–6, inclusive at the sides thereof, but paired. This will be later fully described.

PROTECTIVE BLOCKS WITH EYELETS

FIGS. 7, 8 and 10–12, inclusive disclose blocks of the character described having eyelets provided on the sides thereof for engagement with resilient tensioning devices such as springs and elongate resilient strips and/or over-center toggle devices which are also tensioning means.

FIG. 7 shows such a block with integrally molded horizontal eyes or eyelets thereon, while FIG. 8 shows the same with vertical eyelets thereon. FIG. 10 shows an eyelet of plastic or metal (preferably relatively resilient, but tough plastic such as teflon, polyethylene or the like) which is glued or adhesively attached to the sides (either horizontally or vertically oriented).

FIG. 11 shows the eyelet or engaging loop provided as part of an externally threaded or grooved shaft or bolt which is received in (cast integral with or adhesively secured to) the block itself.

FIG. 12 shows a block like that of FIG. 7, but with paired, integrally molded cast eyelets.

Referring more specifically to FIG. 7, therein is shown a track plate generally designated 27 having a flat or base portion 27a and a cleat 27b extending upwardly at substantial right angles thereto. Mounted on the outboard surface of the plate 27 forward of the integral clear 27b there is seen an elongate block of rubber or other resilient, somewhat deformable composition having flat, opposed, substantially parallel and substantially rectangular inboard and outboard sides 28a, opposed, substantially parallel and substantially rectangular sides 28b and ends 28c also opposed, substantially parallel and substantially rectangular. As previously stated with resepct to the road protecting device 23 of FIGS. 1–6, inclusive, the edges may be rounded to a greater or a lesser degree and the device may be not purely rectangular in horizontal and vertical section (when resting on a flat horizontal surface with one face 28a resting thereon). Thus, the device may be frusto-conical with the larger base thereof positioned against the track element. However, as previously stated, it is preferable that both faces 28a be of substantially the same area and the configuration given is optimum.

With respect to dimension, the length, width and height of the block 28, per se, is preferably the same as described with respect to the block 23. That is, the length of block 28 is substantially the cleat to cleat length in adjacent track plates or, preferably, at least as long as the flat portion of a given plate (see FIG. 6). The thicknss or height of the block 28 is preferably greater than that of the cleat 20b by a sufficient amount that, when the full weight of the vehicle falls on the spaced, attached, road protective devices on both tracks thereof, the cleats 27b do not contact or abrade the road surface or surface which is to be protected. The width of the road protective device 28 is preferably that previously given, namely, less than the total width of the plate 27, but preferably as close thereto as the provision of adequate tensioning devices will permit.

The instant block 28 is provided with a pair of eyelets 29 which are of the same configuration as seen in FIG. 8, but horizontally oriented or, said otherwise, oriented substantially parallel to the faces 28a, which are those which will either abut the track plate portion 27a or the surface to be protected from the tracks of the tracked vehicle. If integrally molded as seen in FIGS. 7 and 8, the substance of which the block and eyelets are molded must be inherently strong enougth to withstand the tension pulls from elongate resilient cords (FIG. 8), coil springs (FIG. 11) over-center toggle devices (FIG. 7) and the like. Reinforcing resilient cords of nylon, cloth or the like may be provided in the molding process in or in the vicinity of the eyelets 29.

The over-center toggle device or (colloquially) "boomer" is generally designated 30 and has body portion 30a and hook members 30b and 30c. Handle 30d is pivoted at 30e on center piece 30f, itself pivoted on body portion 30a at 30c. The operation of over-center toggle is entirely conventional and is not a part of the instant invention. It is merely illustrative of an additional tensioning device which may be used in conjunction with the instant road protective means (such as 23 and 28) in order to removably secure same on track plates such as 20 and 27 for brief use in protecting a surface which the track vehicle is to pass over. The device 30 in FIG. 7 is shown in activated position with the ends of the hooks 30b and 30c as close together as possible. To release the over-center toggle device 30 from the position of FIG. 7, the handle 30d is moved in a counterclockwise direction around the pivot 30e. This moves the ends of the hooks 30b and 30c apart from one another several inches, typically. Thus, an over-center toggle device or boomer 30 which, closed, as seen in FIG. 7 would be 3 inches between the hooks 30b and 30c, would, open, provide, typically, 5 inches therebetween, thus contracting 2 inches in the action of the toggle. Smaller and larger such devices, as well as same of variant form, are available. Turnbuckles of greater or lesser size may be employed and are more secure against inadvertent release but are slower adjusting.

The other eyelet 29 in FIG. 7, which is not shown connected to either a tensioning device or a hook may be engaged in several manners. First, a coil spring of the character seen in FIG. 11 may engage the said eyelet with the other side of the (edge) track element. Alternatively, an elongate resilient strip of rubber-like or plastic material as in FIG. 8 may be employed with a hook on one end engaging the eyelet and a hook on the other end engaging the edge of the track. Yet alternatively, a simple S hook with an elongate shaft between the hooks may be employed. As a further alternative, a pair of blocks 28 may be employed. connected to one another, eyelet to eyelet, using an S hook as seen in FIG. 3 or FIG. 8, with a tensioning device such as an overcenter toggle, an elongate resilient strip, a coil spring or merely a connector (such as a hook) connecting the second block 28 to the far edge of the track. This latter option would be usable when the available road protective devices were or less width than desirable for an exceedingly wide track vehicle. This option is not preferred in that there is another securement which might fail under certain stress conditions. However, this option is useful and will work when wider road protective devices are not available. The eyelets of adjacent blocks on a track element may be connected together in any manner desired, such as by the hooks mentioned or wiring same together or clipping them together in any sufficiently strong, secure fashion using conventional attaching means.

Referring to the device of FIG. 8, the track elements and the block elements of that view are numbered the same (but primed) as the elements of FIG. 7 as there is not difference between the track construction (track element) and the block, per se, save in that the eyelets 29' are positioned at right angles to the eyelets 29 of FIG. 7. The purpose of FIG. 8 is illustrate the use of another tensioning element, namely, an elongate strip of rubber or rubber-like material (31) having eyelet ends 31a (here shown at right angles to one another either in initial formation of the resilient strip or rope 31 or due to 90° twisting of the said strip 31), there being provided engaging the eyelets 31a a pair of conventional S-configuration hooks 32.

Different types of materials give different tension, but generally speaking, the longer the element 31, the greater capacity of tension. This connector and tensioning device may be from, typcially, 1 to 6 inches long. Such a tension element 31 may be employed with another like element on the other side of the block 28', a coil spring as in FIG. 11, an over-center toggle as seen at 30 in FIG. 7 or merely an elongate hook of S-confiquration. In the latter case, the block 28' would not necessarily be tensioned centrally on the track 27'. FIG. 10 merely indicates schematically a road protecting device 28", indicated fragmentarily, with an eyelet generally designated 33 having a flat base 33a and an arcuate eyelet 33b, attached by any suitable conventional adhesive, such as epoxy, as at 34 to the side 28b". The eyelet 33b may be oriented vertically as seen in FIG. 10 like eyelet 29' of FIG. 8 or horizontally as eyelet 29 in FIG. 7. The adhesive material and attachment must be sufficiently strong to withstand the compressive loads of the vehicle on the block and the pulling tension of a tensioning element such as the coil spring, elongate cable or over-center toggle, in combination.

Referring to FIG. 11, therein is shown a road protective device generally designated 34 of the same character as devices 23, 28 and 28', but differing in the manner of connecting the tensioning devices thereto. Device 34 is mounted on a track generally designated 35 having horizontal plate portion 35a and upstanding cleat 35b. The protective device has flat inner and outer faces 34a and sides 34b (only one of which is seen). The view is sectional so the forward and rearward end faces 34c are not seen. The dimensions and configurations of block 34 are of the character described with respect to the devices of the previously described figures.

This fragmentary showing illustrates an eyelet carrying means generally designated 36 having an elongate externally threaded or grooved shaft 36a and typically circular disc or plate 36b attached to the outer end thereof, the latter carrying eyelet 36c. Shaft 36a and plate 36b are preferably molded integrally with block 34 but may be attached othewise thereto as by screwing same into a passage or orifice generally designated 37 in the view of FIG. 11. Passage 37 may carry an internally threaded plastic elbows molded into the block 34 or other conventional type connection for the externally threaded shaft 36a. A coil spring 38 having 90° offset hook ends 38a serves to connect the eyelet 36c and block 34 to one side edge of the track portion 35a. The coil springs may be relatively short as is seen in FIG. 11 or may be elongate like the rubber strap 31 of FIG. 8, depending upon the relative width of the block 34 with respect to the width of the track element 35. (The shorter the tensioning element the better so long as sufficient tension is available and stretch for a given track condition. Said otherwise, the maximum effective bearing area for the protective device is desired.)

As in the case of the eyelet 33b on plate 33a of FIG. 10 eyelet 36 on plate 36b may be oriented vertically with respect to the flat track portion 35a or parallel therewith as in the case of the eyelet 29 of FIG. 7. While the eyelets 33b and 36c and plates 33a and 36b (as well as shaft 36a) may be of non-yielding metal, such is emphatically not preferred as there is considerable compressive load on the blocks 23, 28, 28', 28" and 34. Therefore, such eyelets, plates and shafts are preferably of teflon, tough polyethylene or some other extremely strong and tough but somewhat flexible and resilient plastic material. If the plates and eyelets are of metal, it is conceivable under certain conditions of compressive load that the upper and lower edges of, say, the plates 33a or 36b could bear against the (or very closely against the) flat plate portions such as 35a or 27a' and, if they were of sufficient diameter or width, extend above the cleats 35b or 27b'. In such case, there might be nicking or abrasion of an asphalt surface or the like. Therefore, in any case, it is preferred that the height or diameter of the plates 33a and 36b be not greater than the height of the cleats 35b or 27b', etc. and preferably less than same.

At this point, we mention an additional critical feature of our invention, namely, that the connecting means, and the tensioning devices for the connecting means (which may be one and the same thing) be laterally positioned of the resilient, deformable yet shape retaining blocks 23, 28, 28', 28" and 34 (and the additional blocks to be described) in order that neither the connecting devices nor the tensioning devices will be in the main compressive load line of the vehicle on the blocks. Thus, in the case of the devices of FIGS. 1–6, inclusive, the connecting means comprise the hooks 26. These are quite laterally positioned (and inboard with respect to track portion 20a) with respect to block 23. They are also positioned below the profile of cleat or cleats 20d. Yet further, the tensioning devices of the means of FIGS. 1–6, inclusive are the elongate resilient tails or straps 25. These are also laterally positioned of the main road protective device 23 and are of lesser height than the thickness of block 23.

Turning to the devices of FIGS. 7, 8, 10 and 11 (and FIG. 12 to be described), in these cases, one of the connecting devices to the blocks 28, 28', 28" and 34 comprise the eyelets 29, 29', 33b and 36b with or without associated connectors such as plates 33a and 36b and shaft 36a in the case of FIG. 11. The eyelets and their associated means are positioned at the side walls of the blocks and spaced inwardly thereon, outboard of the bearing faces 28a, etc. thereof. The eyelets themselves are either resilient and yieldable (FIGS. 7 and 8) or so dimensioned as to be either unobtrusive (horizontally positioned in the body of the eyelet) or of such dimension as to be sheltered by the track cleat such as 35b and 27b'. Said otherwise, the eyelets 33b and 36c and their base plates 33a and 36b are of lesser diameter or width than the height and length of side walls 28b'' and 34b. Yet further, with respect to the eyelet devices, the attaching means such as hooks 32 are laterally positioned of the blocks appear. Still further, the tensioning means, such as over-center toggle device 30, resilient rope or strip 31 and coil spring 38 are laterally positioned of the body of the block proper and, under compressive load, are protected not only by the block, but the cleats 35b and 27b'.

[In certain forms of the protective devices seen in the drawings (FIGS. 9a, 9b, 14, 15, 16 and 17), parts of the tensioning means are positioned in the load line. However, these tensioners are of such character as to be relatively invulnerable to load. Further, they are tensioned before load is applied. Finally, their connectors (hooks, etc.) and some of the tension means are laterally spaced of load thrust.]

In the plan view of FIG. 12, there is seen a track element of large size generally designated 39. This track element, of large size and considerable width, has flat portion 39a, leading arcuate edge 31b, large cleat or ridge 31c and arcuate inwardly extending following portion 31d. Thus, the plan view of the cleat 39 shows in a different view the same parts of the heavy duty grouser of FIG. 6 seen in side view. There is provided, for the very large track elements of this wide, heavy track, a road protecting device generally designated 40 having an outboard surface 40a, forward and rearward end edges 40b and one side edge seen, 40c. On both side edges 40c, particularly including the one shown in the view of FIG. 12, there are provided two, spaced, eyelets 41 precisely of the character of the eyelet 29 seen in the right hand of FIG. 6, but two on the one side. A pair of coil springs 42 connect the eyelets 41 to the side edge of the flat portion 39a of track 39. If eyelet 41 were vertical as in the case of eyelet 29' of FIG. 8, the hooks on the coil spring 42 would be normal to one another at the respective ends. However, they are in line with one another, as seen, when the eyelets are parallel to the track element as in FIGS. 12 and 7.

The purpose of the double eyelets on the block 40 and the double coil spring attachment is to provide a stronger and more secure connection (and more tensioning power) with respect to the track protective device where the track element 39 is extremely large. Of course, under certain conditions hooks like hooks 32, over-center toggle devices as members 30 in FIG. 7 or resilient ropes or straps as element 31 in FIG. 8 may be substituted on one or both sides for the coil springs 42 of FIG. 12.

The eyelet constructions of FIGS. 7, 8, 10 and 11 may be paired on each side of the block devices, if desired. However, such are added expense and additional trouble in mounting (time and effort) and are generally not required.

FIGS. 9, 16 and 17 — RESILIENT TENSIONING MEANS EXTENDING THROUGH BLOCK

FIGS. 9, 16 and 17 show various forms of the road protective device wherein the block is provided with a central channel or passage therethrough, through which an elongate tensioning means or device extends. The main purpose of these forms of the invention is to increase the tensioning power or capacity of the tensioning means employed in association with the block (such as a tail of resilient rubber, an over-center toggle device, a coil spring or resilient rope or strap) above that power available when the tensioning means is merely present laterally of the road protecting block or body. Thus, in each of the previously described showings, whether or not the tensioning means was a coil spring, over-center toggle device, a resilient integral tail or a resilient rope or strap, the tensioning device had to be positioned in the area or space between the side faces or edges of the blocks and the side edges of the track elements to which they were or are secured. Since it is desirable, in most cases, to maximize the bearing area on the surface to be protected and the track element, and since the length of the blocks or devices is limited by the succeeding cleats, the width dimension may become critical. Particularly this is true since it is desired to not have to employ any more of the snap-on protective devices than absolutely necessary. The more devices that are required, the more time must be taken to rig the devices on the track and remove same from the track after use. Thus, an arrangement such as in FIGS. 1 and 2 (where the devices are positioned on every third track element) is much preferable over an assembly where the devices are on every other track element or every track element.

While a certain amount of resiliency and tensioning capacity is achievable with the resilient integral tails 25 of the devices of FIGS. 1-6, inclusive and the coil springs of FIGS. 11 and 12, while not sacrificing a great quantity of width (also the over-center toggle device of FIG. 8), nevertheless, the desired bearing area may not be sufficient for the few devices it is desired to employ. This deficiency, insofar as it is a deficiency, is corrected to the largest extent possible in the devices now being described.

FIG. 9a shows a track element generally designated 43 having a flat portion 43a and a right angle cleat 43b thereon. A monolithic block generally designated 44 of the character previously described is here provided having a passageway 45 integrally molded or cut therethrough. This passageway is lined with a polyethylene, teflon or other tough resilient plastic sleeve 46 which is adhesively or otherwise secured (or molded) into block 44, lining the passageway 45. Block 44 has upper and lower faces 44a and side wall or edge 44b visible in the view. An elongate, resilient rubber or resilient plastic rope (or synthetic such as neoprene) 47 extends through passage 45 and sleeve 46 and has (not shown) eyelets on the extreme ends thereof like eyelets 31a of strap or rope 31 in FIG. 8. In the instant case, the openings in the eyelets would be axially parallel to one another to be engaged by hooks (not seen) analogous to hooks 32 of FIG. 8 to engage the side edges of the track flat portion 43a. Generally speaking, the resilient rope or strap 47 might be of greater cross-sectional size to substantially fill the passage 45 and sleeve 46, essentially frictionally, but the lesser cross-section strap 47 illustrates one such which is easily removable (including the enlarged eyelets) through the sleeve and passage for replacement by another strap of a greater or lesser length. Thus it is seen that the entire length of the strap 47 is available for tensioning capacity and power which enables greater draw down power of the block 44 on aggregate as is seen in FIG. 6, which may be tar, tar and gravel, asphalt, mud, soft mud, mud and gravel, etc. The compression load exerted on the block 44 is not brought to bear on the rope 47 until the weight of the tracked vehicle falls on the block 44. Since blocks 44 are first mounted on the upper side of the track, the full tension may be exerted before the load falls on the block and the rope and thus the strap 47 is in tension before it receives any substantial compressive contact from the block. The sleeve 46, which may be of low friction plastic will aid in protecting the resilient rope or strap 47 even under twisting or turning conditions.

If block 44 is strapped on over soft mud on the tracks 27, when the weight of the vehicle drives the blocks into the mud the excess or extra tension capacity in resilient strap 46 will retain the blocks on the track element.

FIG. 17 is a view of a like block 48 having upper and lower (or inward and outward) bearing surfaces 48a, fron and rear end faces 48b and side walls or faces 48c. Again there is provided through block 48 a passage or opening 49 which may or may not be lined by a sleeve 50 analogous to sleeve 46 of FIG. 9a.

In the case of FIG. 17, the resilient tensioning means provided comprises an elongate coil spring 51 having hooks 51a at the ends thereof. The coil spring 51 may be of sufficient length that the hooks 51a thereof actually themselves engage the side edges of a track plate element. However, alternatively, and most preferably, additional connecting or tensioning means such as hooks (like hooks 32 of FIG. 8) or over-center toggle devices (in the nature of element 30 of FIG. 7) or additional coil springs (in the nature of coil spring 38 of FIG. 11) or even resilient ropes or straps of the character of strap 31 in FIG. 8 may be employed therewith. In this manner, there is provided an internal tensioning device giving greater tension capacity and resilient strength through the entire center of block 48 which may be associated with simple hook means or other tensioning or connecting devices of the character described to adapt to substantially any width track element. In the event that hooks only are employed, it would be contemplated that the width of block 48 would be essentially or substantially the width of the track element which is being protected.

FIG. 16 is a view of a block 52 analogous to block 44 of FIG. 9a and block 48 of FIG. 17. Block 52 has inner and outer bearing faces 52a, forward and rearward end faces 52b and side walls or faces 52c. An elongate passage way or opening 53 is provided through block 52 which may or may not be lined with a protective sleeve like sleeve 46 of FIG. 9a or sleeve 50 of FIG. 17. Here such is not present in the view. There is provided within passageway 53 an elongate resilient rubber, neoprene or resilient plastic strap or cable 54 having enlarged eyelet heads 54a on the ends thereof with passages 54b therethrough for engagement with either hook means or connecting and/or tensioning devices such as over-center coupling devices, coil springs or additional elongate resilient straps.

Once again, while strap 54 is shown as (untensioned) essentially the width of block 52 between eyelet heads 54a, same could be spaced further apart and the strap 54 of greater length as in the case of the straps of FIG. 9a (47) and 9b (to be described). However, when same is of the substantial length seen in FIG. 16, the hooks, coil springs, additional resilient straps, over-center connectors or combinations thereof that may be used therewith may be of relatively short length, whereby the width of the block 52 may be relatively maximum with respect to the width of the plate element of the track being protected. It is further again noted that, the blocks 52 would be mounted on the tracks on the upper or end surfaces thereof before the load fell thereon, whereby the straps 54 would be in full tension prior to receiving any compressive load in use. Therefore, unless there would be excessive twisting or turning stresses, no excess or severing stress would be expected to fall on the resilient strap 54.

Returning to the coil spring 51 of FIG. 17, again it would be under tension before load fell thereon. The wear on the spring 51 of FIG. 17 would be expected to be more than on the strap 54 of FIG. 16 because of the spring's relatively lesser compressibility, per se.

Returning to FIG. 9b, therein is shown a road protecting device like that in FIG. 9a, but differing in three characteristics. First, block 55 (generally designated) is made up or fabricated of flat laminated slabs of rubber, neoprene or resilient, flexible, deformable yet shape retaining plastic material. In the case of rubber, these slabs are vulcanized together. In the case of plastic material, same are adhesively or otherwise fixedly and integrally attached, one to the other. These lamitations are numbered 56–60, inclusive, with the center lamination (58) relieved centrally of the block to provide an essentially square passageway 61 therethrough. An elongate resilient rope or strap of rubber, neoprene or other resilient plastic substance 62 is received within the passage 61 and may either be of a length like strap 54 in FIG. 16 or of considerably greater length as seen in FIG. 9b, extending outwardly on both sides of block 55. Strap 62 terminates at each end in eyelet heads 62a to which may be attached hooks 63. This view also shows the elongate resilient strap 62 essentially frictionally fitting within the passage 61. The parts of the track element of FIG. 9b which are the same as those of FIG. 9a are numbered the same, but primed. A resilient sleeve like sleeve 46 in FIG. 9a or sleeve 50 in FIG. 17 may be provided, but is not necessary because the strap 62 will be under tension before the load comes onto the block 55.

FIGS. 14 AND 15 (EXTERNAL TENSIONING MEANS)

The track element of FIGS. 14 and 15 consists of a rectangular flat portion 64a, a cleat 64b, a forward outwardly ridged portion 64c and a rearward inwardly arcuate portion 64d analogous to the elements of the track element seen in FIG. 6 but with a lesser height cleat. The road protecting block of FIGS. 14 and 15 is generally designated 65 having upper and lower bearing suraces 65a, forward and rearward end faces 65b and side faces 65c. Otherwise than will be hereafter described, the dimensions and nature of the block 65 is substantially that of the previously described road protective devices with respect to dimension, composition and characteristics under load.

The instant device is provided with a pair of elongate grooves or recesses 66 centrally positioned on the inboard and outboard faces 65a and extending transversely the width of the block 65. Alternatively, but one groove or recess 66 may be provided in but one of the faces 65a, but, preferably, two such grooves are provided for longer life and greater utility in the block.

The connecting and tensioning means employed with the blocks 65 comprises either an elongate coil spring (not shown) or an elongate resilient rope or strip 67 of rubber/neoprene or other resilient synthetic substance of the nature of straps 31 (FIG. 8) 47 (FIG. 9a), 62 (FIG. 9b) or 54 (FIG. 16). Such strap has either metal or plastic eyelet attachments 67a or enlarged eyelet heads of the character seen in the previous resilient ropes or strips adapted to receive and be engaged by conventional S or other conventional configuration hooks 68.

The strap 67 or the equivalent coil spring (not seen) is at least as long as the width of the blocks 65 so that the eyelet means 67a or coil spring end hooks extend beyond the edges of the block 65. In the case of short resilient ropes or coil springs, additional attaching means such as hooks, additional resilient straps (FIG. 8), coil springs (FIG. 11) or over-center toggle connections (FIG. 7) or the like are employed therewith to connect with the said straps or springs received in the groove 66. However, alternatively, as illustrated in the FIGS. 14 and 15, the elongate resilient strap (or coil spring) may be of sufficient length that the connection with the side edges of the plate portion 64a is made with hooks.

The particular advantage of the grooved blocks of FIGS. 14 and 15 lie in the fact that the block may be laid on the flat tread plate and the coil spring or resilient strap, with or without additional tensioning devices or lengtheners, may be cinched over the block and pulled into tension and double engagement with the edges of the track with the vehicle operator in full control of the handling and manipulation of the entire length of the resilient tensioning means 67. In the event shorter such are desired, same may be replaced or used without having to remove such from the block as would be the case in the devices of FIGS. 16 or 9. Longer resilient means may be substituted readily for shorter resilient same. There is a great versatility in this construction which yet provides a considerable protection due to the recessing of the resilient straps in the blocks and the grooves thereof during use. In the event one of the resilient straps or springs is severed or worn out, it may be readily replaced. In the event one face 65a of the block is lacerated or worn down, the other may be subtituted for the engagement.

FIG. 13 (TRIPLE GROUSER SHOE)

Referring to FIG. 13, the structure of the standard triple grouser shoe 22 with its three cleats 22b has already been described. The road protecting device in this showing is generally designated 69 having outboard flat rectangular face 69a, side faces 69b (which only one is seen) and (in full lines) forward and rearward end faces 69c.

The inboard face 69b' is transversely and arcuately relieved as at 70 whereby the center cleat extends up into the arcuate relieved groove or space 70 with the forward and rearward portions of the underside of the block resting in the valleys between the center cleat and the forward and rear cleats, respectively. The block 69 is thus, as seen in full lines, a device of the same basic character as those previously described (particularly with respect to FIGS. 1-6, inclusive), but with the central relieved portion on the inboard side or face 69b' thereof. The length of the device is substantially from the forward face of the rearward cleat 22b to the rearward face of the forward cleat.

In the device shown in FIG. 3, the tensioning devices comprise elongate tails 71 carrying engaging hooks 72 at the outer ends thereof. Tails 71 are of the same character as tails 25 in FIGS. 1-6, inclusive, and have eyelet heads at the end thereof. Alternatively, in place of the tails 71, eyelets for connection to over-center toggle devices, elongate resilient strips or coil springs may be provided on the side faces 69b of block 69. Additionally, as seen in dotted lines, forward and rearward extensions 73 may be provided overlying the forward and rearward grouser cleats 22b. The tensioning and connecting means of the other figures may be employed with this protective device, some paired on each side or single, as desired.

FIGS. 18 AND 19 (TRACK ELEMENT CONNECTING OR ENGAGING MEANS)

In all of the figures except FIG. 7, the actual connecting means employed to couple the road protecting devices with the edges of the individual endless track elements (via the tensioning means) are shown as hooks of one sort or another. FIG. 7 shows an over-center toggle having hook ends. It is most preferable that spring engagement hooks of clamp type be employed in these uses whereby, should the tension on a given hook engaging one side of the track element be briefly relaxed or entirely released the given hook will not readily disengage from the side edge of the element, permitting the road protecting device to fall off. Generally, this will not be a problem in straight line motion of the tracked vehicles or gradual turns thereof. However, in pivoting or high rate turns, particularly those where one track moves and the other track is under braking conditions, there is always the problem of inadvertent disengagement of a connecting means or device from a track element side edge as the tension alternately increases and decreases in the tensioning means on a given side of the road protective device. This occurs if the road protecting device pivots or slides to and fro on the track element under turning or twisting action of the vehicle.

FIGS. 18 and 19 show a preferred form track element edge engaging means which is designed to obviate this problem and yet permit ready application thereof under all conditions of clean or aggregate loaded tracks. This device, made of spring steel, includes the following elements:
1. a strong, broad inboard track element engaging portion;
2. peripheral, lesser dimension arms which are designed to overlie the upper surface of the track element and readily penetrate aggregate masses or loads thereon; and
3. central upper means or area for positive, non-releasing engagement by the resilient tensioning means such as a coil spring.

It should be understood that, except under the most extraordinary conditions, the underside of the track elements (inboard sides) are always clean. To the contrary, the outboard surfaces of the track, as have been previously mentioned in detail, very often will carry mud, mud and gravel, asphalt, tar, and the like, that is, materials in which the track elements have been working and driving the vehicle. Thus, the broad base engagement of the inboard surfaces of the track element at the edges thereof is easily affected, while the lesser area engagement of the top surface of the track with the spring arms penetrating the aggregate load thereon is also relatively easy to effect. In the event track element cleaning is required on the upper surfaces, a minimum of such cleaning or scraping is required to engage the clamp type spring engagement. Additionally, handles may be provided welded, riveted or otherwise attached to the outboard surface of one or both of the clips of an assembly for readily applying and disengaging same from the track elements. The device shown provides inherent tension and gripping power on the track element side edge in the connecting device.

FIGS. 18 and 19 detail the construction of a preferred form of track element edge engaging means. The clip itself is generally designated 75 and has a broad, one-piece, angled inboard plate 75a of substantial rectangular form in plan view. Integrally connected with inboard wall member 75a is side wall 75b also preferably of rectangular form adapted to engage against the side edge 76a of a track element generally designated 76. The outboard portion of clips or element engaging means 75 is made up of two parts. There are two lateral engaging bars or strips 75c connected at their side edges with side wall 75b and angled as seen in FIG. 18 in side view. Interiorly of spring leg member 75c there is provided engaging tab 75d which is preferably angled outboard with respect to track outboard surface engaging members 75c. An opening 77 is provided in central portion 75d for secure engagement by a tensioning means such as the loop end 78a of a coil spring 78 (which here is shown as of sufficient length, when under tension and extension thereof, to engage at the far ends thereof the clips 75 which are removably fitted over the side edges of track 76). The resilient road protecting means or block 79 is of the same character as that seen in FIG. 17 save that no lining sleeve is employed in the opening 80 passing centrally therethrough. Block 79, shown fragmentarily, has side face 79a, outboard face 79b and end face 79c visible in the views. The inboard face 79d is in firm abutment with the outboard face 76b of track element 76, held thereagainst by spring 78.

Shown in dotted lines is a handle member generally designated 81 attached to the outer side of wall 75b by welding or other attachment. Handle 81 has attaching base 81a and T bar grasping element 81b fixed at right angles thereto. The purpose of the provision of such a handle 81 on one or both of opposed clips 75 securing a road protecting element 79 on a track element 76 is to provide readier and more easily affected engagement and disengagement of the clips 75 with the side edges of the track element, whether or not there is aggregate on the outboard surface thereof. It is, of course, contemplated that strong spring or other resilient tensioning element force be acting on each of the clips 75 on opposite sides of the track element when same are engaged. Alternate tensioning elements other than the specific coil spring 78 seen in FIGS. 18 and 19 may, of course, be employed such as the resilient elongate strap 62 of FIG. 9. Likewise, the clips 75 may be employed with any of the road protecting devices of any of the figures and any of the tensioning means and connecting means previously described. The whole purpose of the clips is to provide very secure engagement despite lateral release of tension on one side of a road protecting device on a given track element or alternatively with respect to both sides thereof as the vehicle may move, twist or turn in its travel. Thus, a spring connecting element as used in FIGS. 18 and 19 gives much greater versatility and maneuverability to a vehicle employing same than a vehicle having the road protecting devices without such positive engaging connecting means.

The tension between the inboard beam member 75a and the outboard legs 75c in the clip 75 of FIGS. 18 and 19 is considerable and may be varied somewhat by bending the legs toward one another from their attachment to side wall 75b. The height of side wall 75b is preferably greater than the thickness of the track 76 which it engages whereby the engaging legs and members 75a and 75c may be angled inwardly toward one another, as well as outboard at their inward ends, so that edge contact is made against the track element for more forceful frictional engagement.

FIG. 20

FIG. 20 is a fragmentary end view of a modification of the subject detachable road protecting device mounted on one link or plate of an endless track, this form comprising an integral, molded, monolithic block 100 having integrally molded therewith (or attached thereto) an eyelet 101 to which may be attached a conventional turnbuckle here generally designated 102. Turnbuckle 102 has cage 102a which threadably engages two hook members 102b and 102c, whereby rotation of cage 102a in one direction will move the hooks of members 102b and 102c towards one another and rotation in the opposite direction will move the said hooks away from one another. In FIG. 20, the track plate is designated 103 with the conventional cleat 104 fixed to or integral therewith. The use of turnbuckle 102 at one or both ends of the block 100 serves to provide a means for tightening or tensioning of the block onto the track element or plate 103.

SPECIFIC EXAMPLE

As a specific example of a multi-purpose road protecting device, the following is noted. A device of the configuration of either FIG. 16 (or FIG. 17) 9 inches long, 5½ inches wide and 4 inches thickness may be provided. A ¾ inches round hole is provided through the center to pass either a circular section resilient strap or coil spring. Synthetic or natural rubber would be the material of choice having a durometer reading in the range of 60 to 80, preferably 70. Each edge (end, side, etc., horizontal and vertical) would be beveled or rounded so as to minimize breaking away under compressive and traction loads.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. Track and road protecting means for use with individual track elements of an endless tracked vehicle, successive track elements of said endless track having a transverse cleat on the outboard surface thereof adjacent one end thereof, comprising, in combination:

a resilient, flexible, deformable yet shape-retaining block under load adapted to fit on the outboard face of a single track element of an endless track and positioned thereon, said block substantially rectangular in plan, side and end views and having substantially rectangular, paired and parallel side faces, end faces and inboard and outboard load bearing faces, the length of said block a substantial part of the distance from cleat to cleat of successive track elements, the height of the block substantially greater than the cleat height from the clean outboard surface of the track element, and the width of the block at least a substantial part of the width of the track, means for connecting the block to the opposite side edges of an individual track element positioned laterally of each of the side faces of said block, and resilient tensioning means engaging the block with the inboard portion thereof and the connecting means with the outboard portions thereof, said tensioning means including a coil spring.

2. Track and road protecting means for use with individual track elements of an endless tracked vehicle, successive track elements of said endless track having a transverse cleat on the outboard surface thereof adjacent one end thereof, comprising, in combination:

resilient, flexible, deformable yet shape-retaining block under load adapted to fit on the outboard face of a single track element of an endless track and positioned thereon, said block substantially rectangular in plan, side and end views and having substantially rectangular, paired and parallel side faces, end faces and inboard and outboard load bearing faces, the length of said block a substantial part of the distance from cleat to cleat to successive track elements, the height of the block substantially greater than the cleat height from the clean outboard surface of the track element, and the width of the block at least a substantial part of the width of the track, an engaging eyelet fixed to each of the side faces of said block intermediate the upper and lower edges thereof, rigid means connecting one of said eyelets removably to the adjacent side edge of the single track element on which said block is positioned, and resilient tensioning means connecting the other one of said eyelets, removably, to the other side edge of said track element.

3. Track and road protecting means as in claim 2 wherein said rigid means is length adjustable.

4. Track and road protecting means for use with individual track elements of an endless tracked vehicle, successive track elements of said endless track having a transverse cleat on the outboard surface thereof adjacent one end thereof, comprising, in combination:

a resilient, flexible, deformable yet shape-retaining block under load adapted to fit on the outboard face of a single track element of an endless track and positioned thereon, said block substantially rectangular in plan, side and end views and having substantially rectangular, paired and parallel side faces, end faces and inboard and outboard load bearing faces, the length of said block a substantial part of the distance from cleat to cleat of successive track elements, the height of the block substantially greater than the cleat height from the clean outboard surface of the track element, and the width of the block at least a substantial part of the width of the track, an engaging eyelet fixed to each of the side faces of said block intermediate the upper and lower edges thereof, a first resilient tensioning means removably connecting one of said eyelets to the adjacent side edge of the individual track element on which said block is positioned, and a second resilient tensioning means removably connecting the other one of said eyelets to the other side edge of said track element.

5. Track and road protecting means for use with individual track elements of an endless tracked vehicle, successive track elements of said endless track having a transverse cleat on the outboard surface thereof adjacent one end thereof, comprising, in combination:

a resilient, flexible, deformable yet shape-retaining block under load adapted to fit on the outboard face of a single track element of an endless track and positioned thereon, said block substantially rectangular in plan, side and end views and having substantially rectangular, paired and parallel side walls, end walls and inboard and outboard load bearing walls, the length of said block a substantial part of the distance from cleat to cleat of successive track elements, the height of the block substantially greater than the cleat height from the clean outboard surface of the track element, and the width of the block at least a substantial part of the width of the track, the resilient inboard side of the block, when applied to the track element, fitting directly against the outboard surface of the track element adjacent the cleat thereon with the outboard side of the block projecting outwardly past the top of the cleat, individual hook means positioned laterally of each of the side walls of said block in positive removable engagement with the track element side edge, and a separate connecting element communicating between and interconnecting each said individual hook means and the block on the side wall adjacent thereto intermediate the upper and lower inboard and outboard walls thereof, said last elements, in their connection between said hook means and said block, placing said block under tension, whereby to retain said block positioned on the said outboard face of said track element, the said hook means and connecting elements on each side of the block positioned entirely within the lateral extensions of the profile of the hook, whereby all load is received by and handled by the block, without any load falling on the said hook means or connecting means.

6. Track and road protecting means as in claim 5 wherein both of said separate connecting elements include, in the length thereof, resilient tensioning means.

7. Track and road protecting means as in claim 5 wherein one of said separate connecting elements includes, in its length, resilient tensioning means.

8. Track and road protecting means as in claim 5 wherein one of said separate connecting elements is rigid.

9. Track and road protecting means as in claim 5 wherein one of said separate connecting elements is rigid and the other includes, in its length, resilient tensioning means.

10. Track and road protecting means for use with individual track elements of an endless tracked vehicle, successive track elements of said endless track having three relatively shallow cleats on the outboard surface thereof spaced from one another, one of said cleats on the normally following edge of each track element, comprising, in combination:

a resilient, flexible, deformable yet shape-retaining block under load adapted to fit on the outboard face of a single track element of an endless track and positioned thereon, said block substantially rectangular in plan, side and end views and having substantially rectangular, paired and parallel side faces, end faces and inboard and outboard load bearing faces, the length of said block a substantial part of the distance from the normally leading cleat on a given track element to the normally following cleat of said track element, the height of the block substantially greater than the cleat height from the clean outboard surface of the track element, and the width of the block at least a substantial part of the width of the track, the resilient, inboard side of the block, when applied to the track element, fitting directly against the outboard surface of the track element adjacent the cleats thereon with the outboard side of the block projecting outwardly above the tops of the said cleats, the underside of the block relieved transversely to receive the center cleat of a given track element, individual hook means positioned laterally of each of the side walls of said block in positive removable engagement with the track element side edge, and a separate connecting element communicating between and interconnecting each said individual hook means and the block on the side wall adjacent thereto intermediate the inboard and outboard walls thereof, said last elements, in their said connection between said hook means and said block placing said block under tension, whereby to retain said block positioned on the said outboard of said track element, the said hook means and connecting elements on each side of the block positioned entirely within the lateral extensions of the profile of the block, whereby all load is received by and handled by the block, without any load falling on the said hook means or connecting means.

* * * * *